(12) United States Patent
O'Donnell

(10) Patent No.: US 11,243,531 B2
(45) Date of Patent: Feb. 8, 2022

(54) NAVIGATION SYSTEM FOR A MACHINE

(71) Applicant: Caterpillar Paving Products Inc., Brooklyn Park, MN (US)

(72) Inventor: Timothy M. O'Donnell, Long Lake, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/059,229

(22) Filed: Aug. 9, 2018

(65) Prior Publication Data

US 2020/0050197 A1   Feb. 13, 2020

(51) Int. Cl.
  *G05D 1/00*   (2006.01)
  *G05D 1/02*   (2020.01)
  *G01C 21/30*   (2006.01)

(52) U.S. Cl.
  CPC .......... *G05D 1/0088* (2013.01); *G01C 21/30* (2013.01); *G05D 1/0077* (2013.01); *G05D 1/0219* (2013.01); *G05D 1/0227* (2013.01); *G05D 1/0238* (2013.01); *G05D 1/0278* (2013.01); *G05D 2201/0202* (2013.01)

(58) Field of Classification Search
  CPC .. G05D 1/0088; G05D 1/0077; G05D 1/0219; G05D 1/0227; G05D 1/0238; G05D 1/0278; G01C 21/30
  See application file for complete search history.

(56) References Cited

U.S. PATENT DOCUMENTS

| | | | |
|---|---|---|---|
| 3,811,787 A * | 5/1974 | Beaty | E01C 19/4873 404/84.1 |
| 6,287,048 B1 | 9/2001 | Hollon et al. | |
| 8,073,566 B2 | 12/2011 | Messinger et al. | |
| 8,682,622 B1 | 3/2014 | Brenner et al. | |
| 9,428,885 B2 * | 8/2016 | Nau | E02F 9/265 |
| 9,797,099 B2 | 10/2017 | Engels et al. | |
| 9,841,768 B2 | 12/2017 | Hiramatsu et al. | |
| 2010/0063663 A1 * | 3/2010 | Tolstedt | G05D 1/0231 701/23 |
| 2014/0107883 A1 | 4/2014 | Fritz et al. | |
| 2016/0229397 A1 * | 8/2016 | Muthukumar | B60W 10/20 |
| 2016/0292846 A1 * | 10/2016 | Sprock | G06T 7/001 |
| 2016/0292933 A1 * | 10/2016 | Sprock | G07C 5/008 |
| 2016/0368534 A1 * | 12/2016 | Harda | H04N 7/181 |
| 2016/0370805 A1 | 12/2016 | Mazur et al. | |
| 2017/0079195 A1 * | 3/2017 | Yokoyama | B60W 10/06 |
| 2017/0349185 A1 * | 12/2017 | McNew | B60Q 9/00 |
| 2018/0210443 A1 * | 7/2018 | Matsuzaki | G05D 1/0088 |

FOREIGN PATENT DOCUMENTS

CN   102174792 B   7/2013

* cited by examiner

*Primary Examiner* — Fadey S. Jabr
*Assistant Examiner* — Naeem Taslim Alam
(74) *Attorney, Agent, or Firm* — Bookoff McAndrews PLLC

(57) ABSTRACT

A paving system includes a paving machine, a plurality of locational or positional sensor units coupled to or in communication with the paving machine, and a controller in communication with the plurality of sensor units. The controller is configured to select locational or positional information from one or more active sensor units of the plurality of sensor units and automatically navigate the paving machine.

19 Claims, 3 Drawing Sheets

NAVIGATION SYSTEM FOR A MACHINE

TECHNICAL FIELD

The present disclosure relates generally to a road construction machine, and more particularly, to a navigation system for a machine.

BACKGROUND

The present disclosure relates to paving machines that are used in road surface construction and repairs. Paving machines are typically utilized to lay asphalt or other paving material. Paving often includes exact measurements and positioning of the paving machine over the paving surface. Navigating and steering the paving machine over the course of a paving job can be mentally and physically taxing, potentially leading to user errors. Additionally, different automated navigation and steering systems each have respective benefits and drawbacks.

U.S. Pat. No. 9,797,099, issued to Engels et al. on Oct. 24, 2017 (the '099 patent"), describes a system for varying the width of a molded concrete slab formed by a slipform paving machine. The system of the '099 patent uses a three-dimensional reference system to determine the position of the paving machine relative to an external reference system. Specifically, the '099 patent employs either a total station system or a global navigation satellite system, such as a GPS system, in order to determine the position of the paving machine. However, the position determinations and navigation of the paving machine in the '099 patent is limited to the selected navigation system. Furthermore, the navigation system of the '099 patent does not account for changes in the topography or conditions of the work site. The paving machine of the present disclosure may solve one or more of the problems set forth above and/or other problems in the art. The scope of the current disclosure, however, is defined by the attached claims, and not by the ability to solve any specific problem.

SUMMARY

In one aspect, a paving system may include a paving machine, a plurality of locational or positional sensor units coupled to or in communication with the paving machine, and a controller in communication with the plurality of sensor units. The controller may be configured to select locational or positional information from one or more active sensor units of the plurality of sensor units and automatically navigate the paving machine.

In another aspect, a control system for a paving machine may include a plurality of sensor units and a controller operatively coupled to each of the plurality of sensor units. The controller may be configured to control and steer the paving machine based on information from one or more of the sensor units. The controller may be configured to control and steer the paving machine based on information from a different one or more of the sensor units if the controller detects an abnormality or error condition in the one or more sensor units.

In a further aspect, a method of automatically navigating a machine may include autonomously navigating the paving machine over a worksite using one or more sensors of a plurality of sensors to determine the position of the machine on the worksite or relative to other elements on the worksite. The method may also include detecting an abnormality or error condition in information received from the one or more sensors, and activating or relying on a different one or more sensors of the plurality of sensors to determine the position of the machine on the worksite or relative to other elements on the worksite to navigate the machine.

DETAILED DESCRIPTION

Both the foregoing general description and the following detailed description are exemplary and explanatory only and are not restrictive of the features, as claimed. As used herein, the terms "comprises," "comprising," "having," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

For the purpose of this disclosure, the term "ground surface" is broadly used to refer to all types of surfaces that form typical roadways (e.g., asphalt, cement, clay, sand, dirt, etc.) or upon which paving material may be deposited in the formation of roadways. In this disclosure, relative terms, such as, for example, "about," "substantially," and "approximately" are used to indicate a possible variation of ±10% in a stated value. Although the current disclosure is described with reference to a paving machine, this is only exemplary. In general, the current disclosure can be applied as to any machine, such as, for example, a paver finisher, asphalt finisher, or another machine that moves over the ground surface of a worksite.

Figure 1:
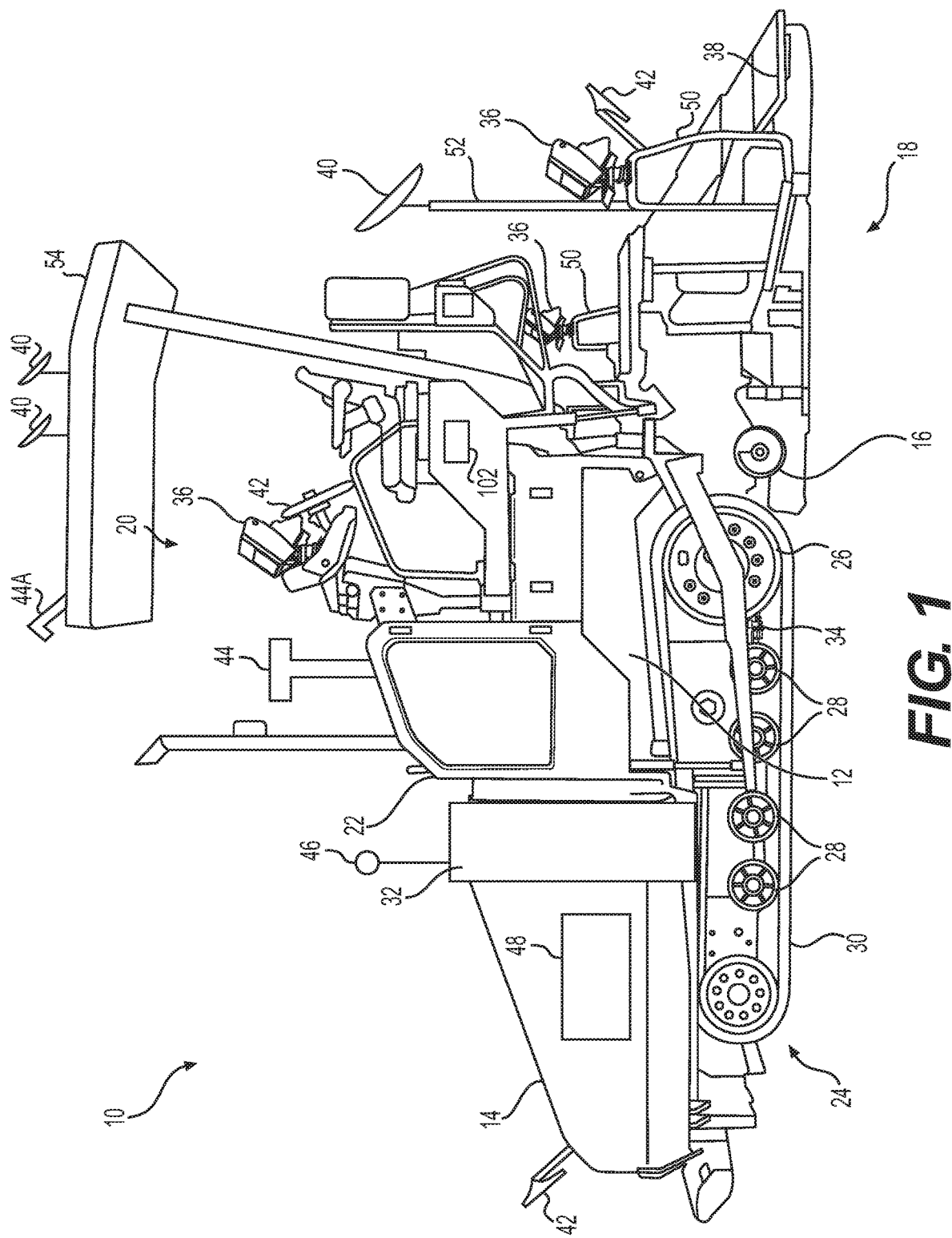
FIG. 1 is an illustration of an exemplary machine, according to aspects of this disclosure.

FIG. 1 illustrates a side view of an exemplary paving machine 10, according to the present disclosure. Machine 10 may be any size paver with any paving width. In one aspect, machine 10 may be a small paver, for example, with a maximum paving width of approximately 5.5 meters. Machine 10 includes a frame 12, a hopper 14, an auger 16, and a screed 18. Machine 10 may also include an operator station 20, from which an operator may maneuver and control machine 10. Machine 10 may be propelled by an engine assembly 22 to power a drive assembly 24, including a drive wheel 26, one or more idlers 28, and tracks 30. Additionally, machine 10 may include a tank 32 and a spray bar 34 to store and deliver a treatment fluid to the ground surface. Machine 10 may also include one or more control panels 36, for example, positioned in operator station 20, in one or more operator positions 38 on screed 18, or remote from machine 10. Control panels 36 may control or display one or more aspects of machine 10 via a controller 102.

Machine 10 also includes a plurality of sensing and/or detecting elements. For example, machine 10 may include one or more GPS antennae 40 and/or one or more proximity sensors 42. In addition, machine 10 may include one or more LIDAR sensors 44, and/or may include one or more stringline sensors 46. Machine 10 may also include one or more total station units 48, which may be detected or otherwise sensed by a universal total station monitor positioned on the worksite. Each of the sensing and/or detecting elements may be coupled to or in communication with one or more user interfaces 106 (FIG. 2), for example, displayed on one or more control panels 36.

As shown in FIG. 1, a GPS antenna 40 may be positioned on a portion of machine 10. For example, GPS antenna 40 may be positioned on one or more rear rails 50 near operator positions 38. GPS antenna 40 may be supported by a pole 52 in order for GPS antenna 40 to be positioned at a height with a reduced likelihood of signal interference. Alternatively or additionally, machine 10 may include one or more GPS antennae 40 on a top portion of machine 10. For example, one or more GPS antennae 40 may be positioned on a roof 54 above operator station 20. Furthermore, in one aspect, machine 10 may include dual GPS antennae, either positioned on one or more of rear rails 50 and roof 54, which may help to increase a signal quality received by the GPS system. The one or more GPS antennae 40 may allow for an accuracy of within approximately +/−3 cm, and the GPS antennae 40 may require an uninterrupted line to one or more global positioning satellites.

One or more proximity sensors 42 may be cameras, radar sensors, sonar sensors, etc. to measure and/or determine a position of machine 10 or portions of machine 10 relative surrounding elements. One or more proximity sensors 42 may be positioned on the front and/or rear portions of machine 10, and may be positioned on the right and/or the left sides of machine 10 or on screed 18. In one aspect, machine 10 includes a proximity sensor 42 in a front right portion, a front left portion, a rear right portion, and a rear left portion. Machine 10 may also include one or more proximity sensors 42 in central portions, on one or more sides of machine 10, for example, aligned with operator station 20. Proximity sensors 42 may emit one or more signals (e.g., light, radio waves, sound waves, etc.), and based on the received reflected signals from an object, proximity sensors 42 may determine a distance between the sensor 42 and the object, and thus a distance between machine 10 and the object. For example, proximity sensors 42 may allow machine 10 to measure a distance from one or more proximity sensors 42 or machine 10 to a curb, guardrail, retaining wall, or other topographical feature, impediment, or object on the worksite. The one or more proximity sensors 42 are in communication with controller 102, and the one or more proximity sensors 42 may also be in communication with any other proximity sensors 42 or other sensors on machine 10 in order to compare the information regarding the surroundings obtained from the plurality of proximity sensors. In one aspect, a plurality of proximity sensors 42 may be used to create a three-dimensional point cloud of the surroundings of machine 10. As such, one or more proximity sensors 42 may help machine 10 maintain a desired distance or position relative to one or more objects on the worksite. Proximity sensors 42 may allow for an accuracy of within approximately +/−25 mm, and proximity sensors 42 may require an object, topographical demarcation, or some optical change between surfaces. If proximity sensors 42 are optical sensors, like cameras, dirt, water, or other contaminants on a lens or in the air on the worksite may interfere with the sensing.

One or more LIDAR sensors 44 may be mounted on machine 10. For example, one or more LIDAR units 44 may be mounted on machine 10 above engine assembly 22, between operator station 20 and hopper 14 or tank 32. Alternatively or additionally, one or more LIDAR sensors 44 may be mounted on roof 54. LIDAR sensors 44 may be positioned centrally within a width of machine 10, or may be mounted on left and right sides of machine 10. LIDAR sensors 44 may measure a distance from one or more stationary objects, such as, for example, street signs, buildings, etc., which may then be used as reference points as machine 10 moves along the worksite. LIDAR sensors 44 may obtain data for 360 degrees around each LIDAR sensor 44. Alternatively, one or more LIDAR sensors 44, for example, LIDAR sensor 44A mounted on roof 54, may obtain data for 180 degrees representing the front half of machine 10 and the worksite forward of the front half of machine 10. Furthermore, one or more LIDAR sensors 44 may be mounted on a side of machine 10, and may obtain data for 180 degrees representing a one side of machine 10 and the worksite to the side of machine 10. LIDAR sensors 44 may allow for an accuracy of within approximately +/−25 mm, and require stationary objects within a clear line of sight from machine 10. Additionally, in one aspect, LIDAR sensors 44 may include an improved accuracy, for example, approximately +/−20 mm, approximately +/−15 mm, or approximately +/−10 mm, when measuring shorter distances (e.g., distances of 10 m or less).

One or more stringline sensors 46 may be mounted on machine 10. For example, one or more stringline sensors 46 may be mounted on respective sides of machine 10. One or more stringline sensors 46 may be in communication with one or more stringlines that have been positioned on either side of the desired path of machine 10 to ensure an accurate position of machine 10 and its components, for example, a height of screed 18. One or more stringline sensors 46 may allow for determining a position of machine 10 up to an accuracy of within approximately 10 mm, and require one or more pre-positioned stringlines along a desired path.

One or more total station units 48 may be mounted on machine 10. For example, one or more total station units 48 may be positioned on one or more sides of hopper 14 (FIG. 1). Additionally or alternatively, one or more total station units 48 may be positioned on the front, rear, and/or side portions on machine 10. Total station units 48 may be reflectors, which may be in communication with a universal total station monitor. The universal total station monitor may be positioned on worksite within a line of sight of one or more total station units 48 on machine 10. The universal total station monitor may measure the position of machine 10 on the worksite based on the detected total station units 48, and may transmit the measured position back to machine 10, for example, to controller 102. The universal total station monitor may also transmit to machine 10 the position of a desired path, other machines, obstacles, etc. in order to aid in the automated operation and accurate navigation of machine 10. Total station units 48 may allow for determining a position of machine 10 up to an accuracy of within approximately 1 mm, and require a universal total station monitor within a line of sight of machine 10 and its worksite.

While this disclosure includes one or more of GPS antenna 40, proximity sensor 42, LIDAR sensor 44, stringline sensor 46, and total station unit 48, this disclosure is not so limited. In particular, machine 10 may include a plurality of each sensor. As mentioned, machine 10 may include multiple GPS antennae 40, and may include a plurality of proximity sensors around a periphery of machine 10. Furthermore, machine 10 may include a subset of the aforementioned sensors. Machine 10 may also include additional sensors in communication with controller 102, which may be activated and relied upon for navigation.

Figure 2:
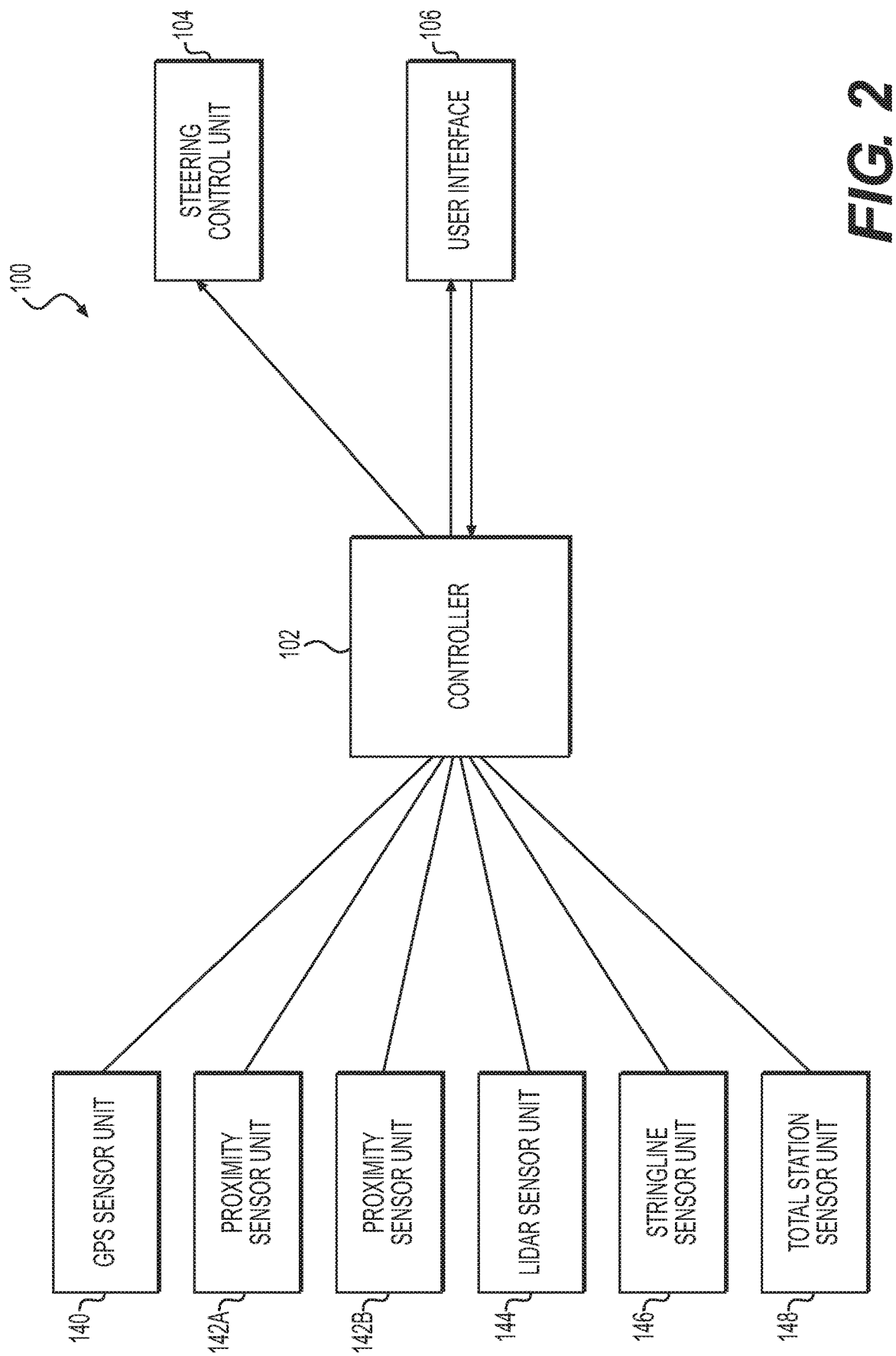
FIG. 2 is a schematic view of a portion of the exemplary machine of FIG. 1, according to aspects of this disclosure.

FIG. 2 illustrates an exemplary schematic view of a control system 100 of machine 10. Control system 100 may include one or more controllers 102 in communication with the one or more sensing units. The communication may be wired or wireless, for example, via Bluetooth®, Wi-Fi, radio frequency, etc. As shown in FIG. 2, controller 102 may be in communication with a GPS sensor unit 140, which may be coupled to or incorporated within the one or more GPS antennae 40. Controller 102 may also be in communication with one or more proximity sensor units, for example, a first proximity sensor unit 142A and a second proximity sensor unit 142B, with each of first proximity sensor unit 142A and second proximity sensor unit 142B being coupled to or incorporated within proximity sensors 42 positioned at various positions on machine 10 (e.g., left and right sides of machine 10). It is noted that machine 10 and control system 100 may include any number of proximity sensors 42 and proximity sensor units 142 in order to accurately detect and measure the position of machine 10 relative to the surroundings on the worksite.

Controller 102 may in communication with one or more LIDAR sensor units 144, which may be coupled to or incorporated in one or more LIDAR sensors 44. Controller 102 may also be in communication with one or more stringline sensor units 146, which may be coupled to or incorporated in one or more stringline sensors 46. Furthermore, controller 102 may be in communication with one or more total station sensor units 148, which may be coupled to or incorporated within the universal total station monitor unit that detects the position of one or more total station units 48.

Controller 102 is also in communication with a steering control unit 104. Steering control unit 104 may be connected to engine assembly 22 and drive assembly 24 in order to control the direction, speed, etc. of machine 10 during an automated steering operation. Although not shown, controller 102 may also be in communication with a screed control unit, which may control the height and/or width of screed 18 during the paving operation.

Furthermore, control system 100 includes one or more user interfaces 106 in communication with controller 102. Each user interfaces 106 may include a display and a user input, such as, for example, a touch screen, a keyboard, joystick, etc. User interfaces 106 may be incorporated in control panels 36 or otherwise positioned on machine 10. Alternatively or additionally, one or more user interfaces 106 may be remote to machine 10, for example, a tablet, laptop, or a handheld device carried by an operator and/or positioned in a control center for the worksite. User interface 106 may display the position of machine 10 on the worksite based on the location or position information from one or more of GPS sensor 140, proximity sensor unit 142, LIDAR sensor unit 144, stringline sensor unit 146, and total station sensor unit 148.

One or more user interfaces 106 may also include various user inputs. For example, user interface 106 may include an operator selection mechanism, which may allow an operator to select or exclude one or more sensing or detection systems for automated navigation. User interface 106 may also include an operator override, which may allow the operator to control the navigation of machine 10.

Although not shown, controller 102 may be in communication with additional sensors mounted to or within machine 10, for example, an odometer, a speedometer, temperature sensors, etc. Moreover, controller 102 may be in communication with additional displays or operator stations, for example, a central control station for the worksite, an electronic log that records the positions and other operational aspects of machine 10 over a worksite, etc.

Figure 3:
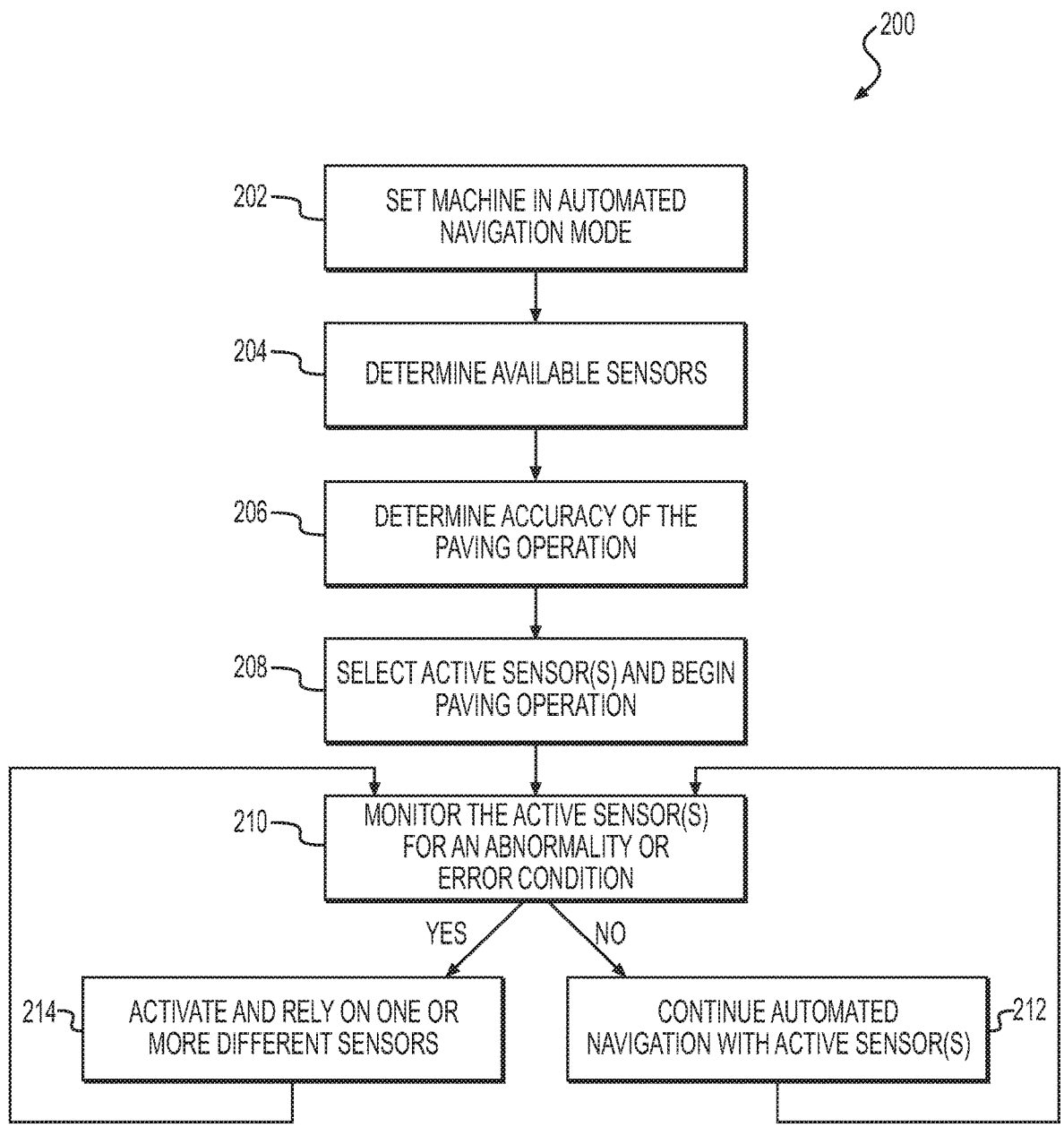
FIG. 3 provides a flowchart depicting an exemplary method for navigating the exemplary machine, according to aspects of this disclosure.

FIG. 3 is a flow diagram portraying an exemplary autonomous navigation method 200 that may be performed by control system 100 to automatically navigate machine 10. Method 200 includes a step 202, where machine 10 may be set in an automated navigation mode. Alternatively, and at any stage of method 200, machine 10 may be set in an operator navigation mode, overriding the automated navigation mode. Method 200 also includes a step 204, in which controller 102 determines a list of available sensors. For example, a subset of the aforementioned sensors and sensor units may be coupled to machine 10 at a given time. Similarly, a subset of the aforementioned sensors and sensor units may be operational for machine 10 at a given time. Controller 102 may determine which sensors are available by sending electrical signals to respective sensor connections, and/or by detecting whether any signals are being received from respective sensor connections. In some instances, one or more sensors and sensor units may be removed from machine 10, for example, expensive sensors may be removed from machine 10 when not in use, or one or more sensors and sensor units may be inoperable at a given time.

Once controller 102 has determined the available sensors, control system 100 may perform step 206, in which controller 102 may determine the accuracy requirements for the present paving operation. For example, paving a highway may require a more accurate navigation than paving a side street or a parking lot. The desired accuracy requirements may be input by the operator, or may be based on sensed information, for example, the proximity of machine 10 to obstacles or impediments. Alternatively or additionally, controller 102 may include a memory storing one or more reference lists that may include required accuracies for sensor data based on the type of paving being performed, which controller 102 may then use to determine which sensor or sensors to activate and use to navigate during a paving operation. In one aspect, if the available sensors are not sufficient to meet the accuracy requirements, controller 102 may transmit a signal to be displayed on one or more user interfaces 106 to advise the operator. Alternatively or additionally, in such a situation, control system 100 may indicate on user interface 106 that automated navigation is not available.

With the available sensors and the accuracy requirements for the present paving operation, controller 102 may preform step 208, in which controller 102 selects active sensors for the paving operation and begins the automated navigation paving operation. For example, controller 102 may select to activate and rely upon GPS antenna 40 and GPS sensor unit 140. Controller 102 may activate and rely upon multiple sensors and sensor units to increase the accuracy of the paving operation. Alternatively or additionally, control system 100 may display the list of available sensors on user interface 106 such that an operator may select the active sensors and/or modify the sensors selected by controller 102. Control system 100 may also allow an operator to modify the active sensors during the paving operation.

During the automated paving operation, controller 102 may constantly or periodically perform step 210, in which controller monitors the active sensors for an abnormality or error condition. An error condition may be, for example, a reduced quality signal, a loss of signal (e.g., GPS antenna 40), a loss of one or more reference points (e.g., proximity sensor 42 or LIDAR sensor 44), a loss of a line of sight (e.g., LIDAR sensor 44 or total station unit 48), a physical disconnection (e.g., stringline sensor 46), etc. The error conditions may also be based on environmental conditions, such as, fog, rain, snow, etc., and/or ground conditions, for example, changing topography, increased distance away from one or more reference points, etc. If controller 102 does not detect an error condition, then controller 102 continues the automated operation in step 212, and continues to monitor the active sensors, as in step 210. If controller 102 detects an error condition in one or more of the active sensors, controller 102 may instead activate and rely on one or more different sensors in step 214, provided that those one or more different sensors are not also experiencing error conditions. Step 214 may also include an alert indication to be sent and displayed on one or more user interfaces 106. Controller 102 will then continue to monitor the new active sensors, as in step 210.

Controller 102 may also control the position or extension of screed 18 based on information received from the sensors. For example, although not shown, screed 18 may include a right side portion and a separate left side portion, and the right and left side portions may be separately extendable or retractable to adjust a paving width of machine 10. Machine 10 may also include screed position sensors coupled to the right and left side portions of screed 18, for example, coupled to hydraulic cylinders that control the extension or retraction of the portions of screed 18. In one aspect, the screed position sensors measure the position of portions of screed 18 relative to frame 12 of machine 10, and the screed position sensors may be accurate up to +/−1 mm. Additionally, the screed position sensors may be in communication with controller 102. As such, controller 102 may monitor the active sensor(s) to determine a position of machine 10, and controller 102 may also monitor and/or control the screed position sensors to position the right and left side portions of screed 18 relative to frame 12 in order to conduct the paving operation with a desired position and paving width. In another aspect, machine 10 may include one or more additional sensors on the right and left side portions of screed 18. For example, machine 10 may include one or more of GPS antenna 40, proximity sensor 42, LIDAR sensor 44, stringline sensor 46, or total station unit 48 positioned on portions of screed 18, and these additional sensors may be in communication with controller 102 or a separate screed controller that is a part of control system 100.

INDUSTRIAL APPLICABILITY

The disclosed aspects of machine 10 may be used in any paving or construction machine to assist in automated navigation and steering over a worksite. During a paving operation, for example, an operator may set control system 100 to conduct an automated paving operation on the worksite, in step 202. Step 202 may include activating a pre-programmed paving operation or paving area, for example, a pre-determined width and length of paving material over a paving course. The paving course may be overlaid on a map of the area to be paved. Control system 100 may then determine the available sensors in step 204, determine the accuracy of the paving operation in step 206, and select active sensors and begin the paving operation in step 208. In one aspect, control system 100 may determine that GPS sensor unit 140 and one proximity sensor unit 142 are the active sensors, even though one or more additional sensors may be available. The one proximity sensor unit 142 may, for example, correspond to a camera mounted on a right-side of machine 10. Control system 100 may employ GPS sensor unit 140 to achieve a positional accuracy of +/−3 cm relative to the mapped topography of the worksite, and may employ the right-side mounted camera proximity sensor unit 142 to achieve an accuracy of +/−25 mm relative to elements detected by the camera. In this example, the camera may monitor the position of machine 10 relative to an edge of the roadway, such as, for example, a curb on the right side of the road, which may be a constant distance from the camera during the paving operation.

Control system 100 monitors the active sensor(s) during the paving operation, as discussed above with respect to step 210. In one example, machine 10 may approach a topographical change, such as a driveway connecting to the roadway, resulting in there no longer being a curb for proximity sensor unit 142 to detect or the curb turning to follow a portion of the driveway. Proximity sensor unit 142 and controller 102 may detect that the curb input disappears or turns away toward the right (i.e., into to the driveway). Without recognizing this abnormality, machine 10 would turn into the driveway. However, control system 100, in steps 210 and 214, will recognize that the direction indicated by proximity sensor unit 142 does not correspond or align with the information from GPS sensor unit 140. As such, the right side camera associated with proximity sensor unit 142 indicates an abnormality or error condition. Accordingly, controller 102 may activate a different available sensor. For example, controller 102 may activate LIDAR sensor 44 such that LIDAR sensor unit 144 may accurately communicate the position of machine 10 relative to one or more stationary objects (e.g., a house, a street sign, etc.), which controller 102 may then use to accurately steer and navigate machine 10 over the paving operation. Operating with GPS sensor unit 140 and LIDAR sensor unit 144 may allow controller 102 to maintain the +/−25 mm accuracy through the portion of the paving operation that has a driveway, and thus no curb.

Once the proximity sensor unit 142 associated with the right side camera detects the curb again, proximity sensor unit 142 may signal controller that an abnormality or error condition no longer exists. Controller 102 may then activate proximity sensor unit 142 and deactivate LIDAR sensor unit 144 and rely on GPS sensor unit 140 and proximity sensor unit 142 for the +/−25 mm accuracy with the GPS location and right hand curb serving as references for the steering and navigation of machine 10. Alternatively, control system 100 may employ LIDAR sensor unit 144 until an abnormality or error condition occurs, such as, for example, a loss of sight line to a stationary reference point. In such a case, control system 100 may then activate one of proximity sensor units 142, stringline sensor unit 146, or total station sensor unit 148, or may cease automated navigation and transmit a notification to user interface 106 indicating a need for operator navigation.

In another aspect, control system 100 may navigate machine 10 via LIDAR sensor unit 144, but a loss of one or more stationary objects within view of LIDAR sensor 44 may require control system 100 to activate and rely on one or more different sensor units. Moreover, control system may navigate machine 10 via total station sensor unit 148, but a loss of a direct line of sight between the universal total station monitor and the one or more total station units 48 on machine 10 may require control system to activate and rely on one or more different sensor units. Similarly, a loss of a GPS signal and/or a disconnection of a stringline may require control system 100 to deactivate GPS sensor unit 140 and/or stringline sensor unit 146 and activate and rely on one or more different sensor units.

Control system 100 may navigate machine 10 using any one or more sensor units, as shown in FIGS. 1 and 2. While using two sensor units may increase the accuracy and/or relative positioning of machine 10 on the worksite, control system 100 may rely on any one sensor unit if necessary. For instance, weather, topographical conditions, cost limitations, etc. may limit the sensors and sensor units available for a given machine 10 on a particular worksite. Nevertheless, control system 100 is able to determine the sensors that are available and operational at any given time, and employ one or more of the available sensors to accurately steer and navigate machine 10 over the course of a paving operation or otherwise notify an operator of various conditions. Accordingly, the paving operation may maintain highly accurate measurements and machine positioning, while also reducing the mental and physical effects and risk of human error that are inherent in manual navigation. Furthermore, while much of this disclosure is directed to a paving machine, this disclosure is not so limited, as control system 100 and method 200 may be implemented on any machine used in construction where accuracy is important.

Control system 100 may also control the position of screed 18. For example, controller 102 may control the extension or retraction of screed 18, for example the right side portion and the left side portion of screed 18. In another aspect, controller 102 may control the steering of machine 10, and control system 100 may include a separate screed controller (not shown) that is in communication with the plurality of sensors and controls the position of screed 18. In either example, the accuracy for steering machine 10 and positioning screed 18 may depend on the paving operation, but control system 100 may include a lower accuracy requirement for steering machine 10 than the accuracy for positioning screed 18. For example, when machine 10 is paving a right side of a road next to a curb, the steering of machine 10 may be controlled by GPS sensor unit 140 and may include an accuracy of approximately +/−3 cm. The position of the right side portion of screed 18 may be controlled by stringline sensor 46 positioned on right side portion of screed 18 in communication with a stringline such that control system 100 may determine the position of the right side portion of screed 18 and appropriately position the right side portion of screed 18. Accordingly, the right side portion of screed 18 may be positioned with an accuracy of +/−5 mm relative to the stringline. The left side portion of screed 18 may be positioned based on the position of the right side portion of screed 18. For example, control system 100 may use the determined position of the right side portion of screed 18, the position of the right side portion of screed 18 relative to frame 12 via the screed position sensor coupled to the right side portion of screed 18, and the position of the left side portion of screed 18 relative to frame 12 via the screed position sensor coupled to the left side portion of screed 18 to determine a position of the left side portion of screed 18. The position of the left side portion of screed 18 may be determined +/−10 mm. Accordingly, the portions of machine 10 that are closest to the paving line or obstacle, for example, the right hand curb, may be positioned with a greater accuracy, without the need for each portion of machine 10 to be positioned with the same accuracy requirement.

It will be apparent to those skilled in the art that various modifications and variations can be made to the disclosed machine without departing from the scope of the disclosure. Other embodiments of the machine will be apparent to those skilled in the art from consideration of the specification and practice of the control system for a paving machine disclosed herein. It is intended that the specification and examples be considered as exemplary only, with a true scope of the disclosure being indicated by the following claims and their equivalents.

What is claimed is:

1. A paving system, comprising:
a paving machine;
a plurality of locational or positional sensor units configured to be coupled to or in communication with the paving machine, wherein the plurality of locational or positional sensor units each include a respective accuracy and a respective mode of operation; and
a controller in communication with the plurality of sensor units;
wherein, upon being set in an autonomous navigation mode and before beginning the navigation of the paving machine, the controller is configured to initially determine a subset of the plurality of sensor units that are available and operational;
wherein the controller is configured to select locational or positional information from one or more active sensor units of the plurality of sensor units that are available and operational and automatically navigate the paving machine, wherein the controller is configured to select locational or positional information from one or more active sensor units of the plurality of sensors units that are available and operational based on accuracy and mode of operation requirements for the navigation of the paving machine for a particular paving operation, and
wherein the controller is configured to initially determine the subset of the plurality of sensor units that are available and operational by sending signals to respective sensor connections and by detecting whether any signals are being received from the respective sensor connections.

2. The paving system of claim 1, wherein the paving machine includes a screed, and wherein at least one of the locational or positional sensor units is coupled to or in communication with a portion of the screed.

3. The paving system of claim 1, wherein the controller is configured to monitor the information received from the one or more active sensor units to detect an abnormality or error condition; and
wherein if the controller detects an abnormality or error condition, the controller is configured to activate one or more different sensors of the plurality of sensor units that are available and operational.

4. The paving system of claim 1, wherein the paving system further includes a user interface configured to display the one or more active sensor units.

5. The paving system of claim 1, wherein the plurality of sensor units includes at least one GPS sensor unit that comprises at least one GPS antenna to receive locational information from one or more satellites.

6. The paving system of claim 1, wherein the plurality of sensor units includes at least one proximity sensor unit coupled to at least one proximity sensor positioned on the paving machine, and wherein the at least one proximity sensor unit is configured to detect a distance between the proximity sensor and an object or a topographical feature.

7. The paving system of claim 6, wherein the at least one proximity sensor includes a front right proximity sensor coupled to a front right portion of the machine, a front left proximity sensor coupled to a front left portion of the machine, a rear right proximity sensor coupled to a rear right portion of the machine, and a rear left proximity sensor coupled to a rear left portion of the machine.

8. The paving system of claim 1, wherein the plurality of sensor units includes at least one LIDAR sensor unit coupled to at least one LIDAR sensor positioned on the paving machine, and wherein the at least one LIDAR sensor unit is configured to identify one or more stationary objects or topographical features and a distance between the at least one LIDAR sensor and the one or more stationary objects or topographical features.

9. The paving system of claim 1, wherein the plurality of sensor units includes at least one stringline sensor unit coupled to at least one stringline sensor positioned on the paving machine, and wherein the at least one stringline sensor unit is configured to detect one or more stringlines positioned on a worksite.

10. The paving system of claim 1, wherein the plurality of sensor units includes at least one total station sensor unit in communication with a total station system configured to detect at least one total station unit positioned on the paving machine such that the total station system identifies a position of the paving machine on a worksite.

11. A control system for a paving machine, comprising:
a plurality of sensor units configured to be coupled to or in communication with the paving machine, wherein at least one sensor unit of the plurality of sensor units includes a different accuracy than at least one other sensor unit; and
a controller operatively coupled to each of the plurality of sensor units, wherein the controller is configured to control and steer the paving machine based on information from one or more of the sensor units, and wherein the controller is configured to control and steer the paving machine based on information from a different one or more of the sensor units if the controller detects an abnormality or error condition in the one or more sensor units,
wherein, upon being set in an autonomous navigation mode and before initiating a particular paving operation, the controller is configured to initially determine a subset of the plurality of sensor units that are available for the particular paving operation, and wherein the controller is configured to select one or more active sensor units of the available sensor units based on an accuracy requirement of the particular paving operation.

12. The control system of claim 11, wherein the plurality of sensor units includes a plurality of proximity sensors positioned around a periphery of the paving machine.

13. The control system of claim 12, wherein the plurality of sensor units further includes a GPS sensor unit, a LIDAR sensor unit, a stringline sensor unit, and a total station sensor unit.

14. The control system of claim 13, wherein the controller is configured to control and steer the paving machine based on information received from the proximity sensors when a topographical feature is a constant distance from the paving machine during a portion of a paving operation, and wherein the controller is configured to switch between information received from the proximity sensors and information received from the GPS sensor unit when the topographical feature is not a constant distance from the paving machine during another portion of the paving operation.

15. A method of automatically navigating a paving machine, comprising:
receiving a signal setting the machine in an automated navigation mode;
before initiating a paving operation, initially determining a set of available sensors from a plurality of sensors associated with the machine by sending signals to respective sensor connections and by detecting whether any signals are being received from the respective sensor connections, wherein each sensor of the plurality of sensors includes a respective accuracy and a respective mode of operation;
autonomously navigating the machine over a worksite using one or more sensors of the available sensors to determine a position of the machine on the worksite or relative to other elements on the worksite, wherein the one or more sensors of the available sensors is selected based on an accuracy requirement of the paving operation and a mode of operation requirement of the paving operation;
detecting an abnormality or error condition in information received from the one or more sensors of the available sensors; and
activating or relying on a different one or more sensors of the available sensors to determine the position of the machine on the worksite or relative to other elements on the worksite to navigate the machine, wherein the different one or more sensors of the available sensors includes an accuracy within the accuracy requirement of the paving operation and includes a mode of operation within the mode of operation requirement of the paving operation.

16. The method of claim 15, wherein the plurality of sensors includes a plurality of proximity sensors positioned around a periphery of the machine.

17. The method of claim 16, wherein the plurality of sensors further includes a GPS antenna, a LIDAR sensor, a stringline sensor, and a universal total station monitor unit configured to detect one or more total station units positioned on the machine.

18. The method of claim 17, wherein the autonomous navigation of the machine over the worksite includes using the GPS antenna to determine a location of the machine, wherein the autonomous navigation of the machine over the worksite further includes contemporaneously using one or more of the proximity sensors to determine a position of the machine relative to one or more objects or topographical features on the worksite based on a desired accuracy, wherein the plurality of sensors includes at least one sensor positioned on or in communication with a portion of a screed on the machine, and wherein the method includes positioning the portion of the screed based on the at least one sensor positioned on or in communication with the portion of the screed and positioning the machine based on another of the plurality of sensors.

19. The control system of claim 11, wherein the controller is configured to initially determine the subset of the plurality of sensor units that are available and operational by sending signals to respective sensor connections and by detecting whether any signals are being received from the respective sensor connections.

* * * * *